UNITED STATES PATENT OFFICE.

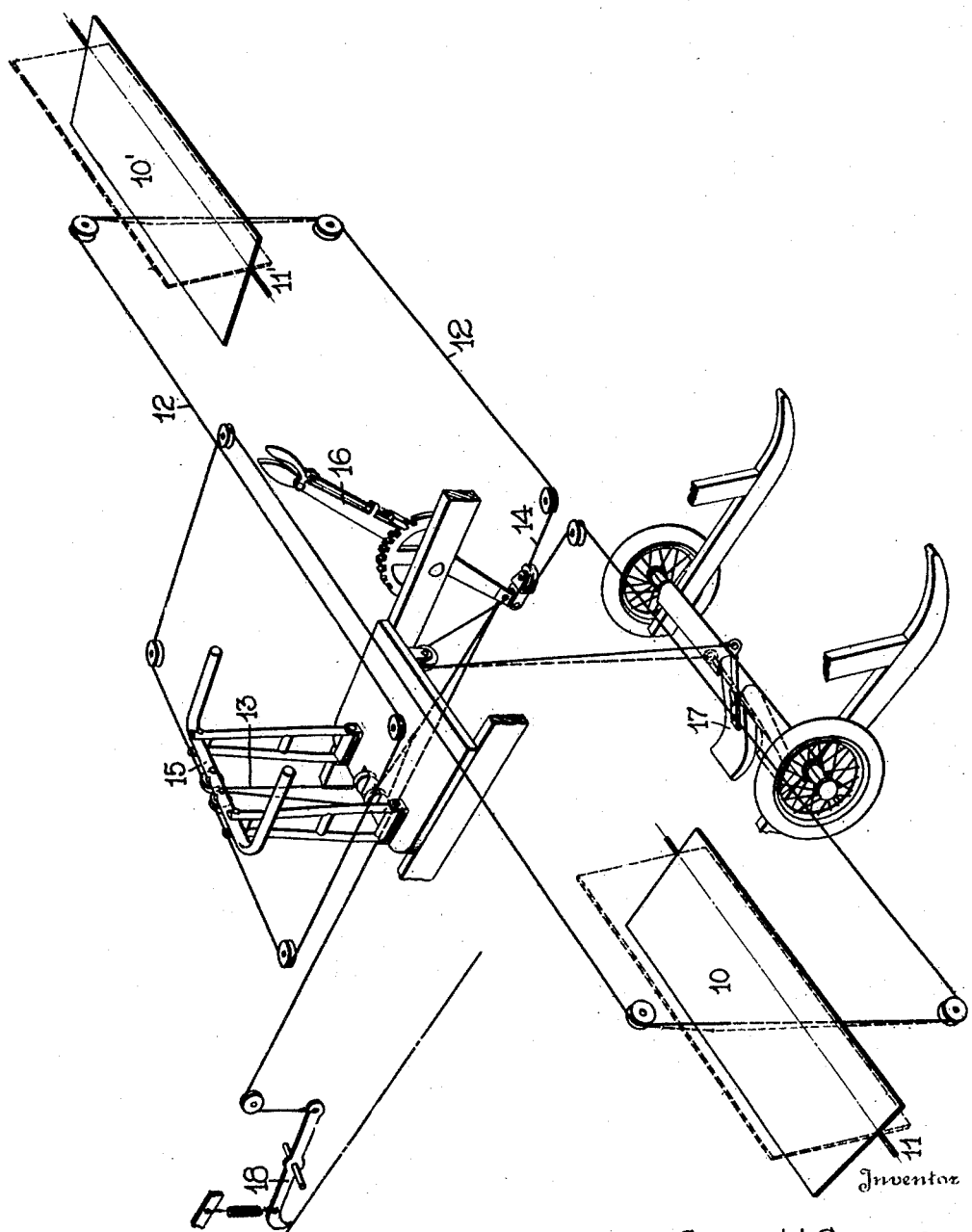

GLENN H. CURTISS, OF HAMMONDSPORT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

AILERON BRAKING SYSTEM.

1,368,548.      Specification of Letters Patent.      Patented Feb. 15, 1921.

Application filed January 21, 1915. Serial No. 3,511.

*To all whom it may concern:*

Be it known that I, GLENN H. CURTISS, a citizen of the United States, residing at Hammondsport, in the county of Steuben and State of New York, have invented certain new and useful Improvements in Aileron Braking Systems, of which the following is a specification.

This invention is intended particularly to supply the need, in aeroplanes and other types of high speed aircraft, of a means by which their movement may be checked with great rapidity so as to bring them to a standstill in a minimum of time and permit landing in small space. Such means has of course the additional advantages of increasing the flexibility and accuracy of control under both flying and landing conditions, but more particularly under landing conditions.

The invention comprises in its broad aspect surfaces normally occupying a position parallel to the longitudinal axis of the craft but movable at an angle and preferably at right angles thereto so as to impose a more or less heavy head resistance through action of the air rush upon the same, a chassis braking device rendered operative through contact of the craft with the earth or water on landing, and a common operating device connected to said surfaces and said chassis brake and arranged simultaneously to operate said surfaces to their retarding angular positions and to engage said chassis brake. Several embodiments of my invention are known to me, but according to that by means of which I shall illustrate my invention herein I combine the lateral balancing system of the craft with the braking system and thereby cut down the number of parts and the operating connections required. The gross weight and head resistance of the craft are thus kept down. The balancing rudders of aircraft other than those of the Wright type not only normally occupy a position substantially parallel to the longitudinal axis of the craft, but also are movable through a range of 90° or over. A range of 90° is sufficient for the purpose of my invention. By simply providing a normal operating means by means of which the balancing rudders are operated from normal to different angular positions during normal balancing of the craft and an additional operating means so arranged and connected to the balancing rudders with respect to the first that they may be operated independently of the first operating means simultaneously from normal to corresponding angular positions—the two systems are combined. The details of this will be fully apparent from a consideration of the diagram of the system presented herewith.

The various elements entering into the system are characterized as set forth, designation being by means of numerals as indicated upon the drawings.

(10, 10'). These are the ailerons of an aeroplane of the Curtiss type. They are mounted on axes 11, 11', located substantially on the lines of their centers of pressure but preferably slightly forward of the same so as to insure an automatic return of the ailerons to a normal position after deflection. These ailerons however may be of the Farnam or other well known type movable from positions substantially parallel to the longitudinal axis of the craft to positions substantially at right angles thereto. Furthermore as hereinbefore set forth, they may be entirely separate from the balancing surface of the craft, and auxiliary thereto or not as desired.

(12). The series operating cable connection between the ailerons 10, 10'. By means of this the ailerons may be simultaneously moved in opposite directions and to different angular positions as respects each other, though these angular positions may be the same with respect to the plane of flight or the normal line of the air rush.

(13). A loop formed in one side of the connection 12.

(14). A loop formed in the opposite side of cable 12. These loops are maintained by the provision of suitable pulleys at the angles of the loop as indicated.

(15). The shoulder fork of the Curtiss type constituting the operating device or control lever for operating balancing devices 10, 10' under normal conditions. This shoulder fork has connection with the operating cable 12 through loop 13 which it engages by means of pulleys secured to its frame at or near the top thereof, and over which the cable 12 passes to form the mouth of the loop 13. In the plane of the base of the shoulder fork the cable 12 passes over to additional pulleys to the bight of the loop.

(16). A second control lever constituting an operating device by means of which ailerons 10, 10' may be operated to serve their braking function. The bight of the loop 13 is fixedly connected to one end of this lever. The bight of the loop 14 is movably connected to the same end of the lever 16 by means of a suitable pulley connected with the lever and over which the cable 12 is passed. Lever 16 is provided with any suitable means for holding it in the positions to which it may be moved, an ordinary rack and pin lock to be released when the lever is gripped, being shown.

(17). A mechanical brake arranged in connection with the chassis of the aircraft and rendered operative through contact of the aeroplane with and its passage along the ground or water upon alighting. In the form shown this brake is of the surface drag type, comprising a shoe or sprag pivotally connected with the chassis and movable about its pivot against the pressure of a suitable spring to drag upon or dig into the surface of the earth, thus imposing a heavy braking drag upon the craft. This brake is connected as indicated with operating lever 16 to be operated thereby into and out of engaging positions. It is of course understood that this form of brake is but illustrative of any mechanical brake whatsoever, which may be applied to the landing gear or chassis of an air-craft to the same end.

In normal operation the operator sits with his shoulders embraced by the fork 15, and operates the ailerons, 10, 10' in the manner well understood to preserve the balance of the craft. Owing to the fixed connections of the bight of loop 13 and of the portions of loop 13 generally by the pulleys over which the cable 12 passes, the right and left branches of cable 12 are moved simultaneously in the same direction to operate the ailerons 10, 10' to opposite angular positions from normal and with respect to each other, whether movement of fork 15 is right or left. During this operation the lever 16 is maintained forwardly in approximately the position shown and in that position of lever 16, the normal position of the ailerons 10, 10' is substantially parallel with the longitudinal axis of the craft, or, more specifically speaking, with the line of the air rush, the ailerons being neutral surfaces.

When, however, the operator has brought his machine to or very near the earth and desires to stop it in a short distance, he draws lever 16 part of the way or all of the way back, thereby drawing loop 13 through the shoulder fork 15 and simultaneously raising ailerons 10, 10' from normal position to the substantially vertical position shown in dotted lines, by the opposite draft of the right and left sections of the upper part of the cable 12. The loop 14, through which the lower part of the cable 12 plays during normal operation is simultaneously shortened thereby presenting no obstruction to the vertical movement of the ailerons. Simultaneously also, the chassis brake 17 is heavily engaged. Depending upon the degree to which lever 16 has been operated, the drag upon the craft occasioned through the joint action of the air rush upon the ailerons 10, 10' and the action of the chassis brake 17 will be greater or less and the craft will be stopped more or less suddenly as may be desired. Thus is my invention rendered especially applicable to air craft landing at comparatively high rates of speed, and it is possible to bring them to a stop in an extremely small space.

Instead of or in addition to mounting the brake on the chassis, a brake may be attached to the tail of the fuselage, or rear outriggers of the craft, such brake trailing after the machine. The details of this mounting are not shown, as they are immaterial, the important point being that the brake is on a trailing instead of a leading member of the craft and located therefore aft of the main body thereof, upon which the ailerons 10 and 10' are mounted and which are supported usually directly over the chassis as indicated. A brake in this position has the advantage of not disturbing the balance of the craft as it runs along the ground when the brake is pulled in. Broadly speaking this brake may be regarded like the brake 17 as a chassis brake inasmuch as it forms an operating part of the support of the machine when it runs along the ground.

The term chassis brake as used in the appended claims is used in the sense of any brake rendered operative by contact of a part of the craft (the brake itself or other part) with the surface over which the craft travels, land or water. The tailing brake is thus broadly speaking a chassis brake, and in fact will usually be associated with the tail skid or wheel of the craft.

What I claim is:

1. A braking system for aeroplanes comprising a pair of lateral balancing rudders, a series connection therebetween by draft upon which in either direction said balancing rudders are moved from normal simultaneously to different angular positions, a loop in one side of said series connection, an operating device having a mobile connection with said loop for operating said rudders as aforesaid, and a second operating device having a fixed connection with said loop and a mobile connection with the other side of said series connection whereby said balancing rudders may be simultaneously operated from normal position to corresponding angular positions.

2. A braking system for aircraft including balancing rudders, means connecting the rudders in one direction and formed with an intermediate loop, means oppositely connecting the rudders and also formed with an intermediate loop, means operable on the mouth of the first said loop to control the rudders during flight and means operable on the bights of both of said loops to control the rudders upon a landing of the aircraft.

3. A braking system for aircraft comprising a pair of balancing rudders, and operating cable connections therebetween provided with a loop, an operating device engaging said loop adjacent its mouth and movable transversely thereof to operate said balancing rudders to different angular positions from normal, and a second operating device having a connection with the bight of said loop and movable longitudinally thereof to move said connections with respect to the first operating device thereby operating said balancing rudders from normal to corresponding angular positions, together with a chassis brake arranged to be engaged through the operation of said second lever.

4. In a control system for an aeroplane, the combination of a plurality of control surfaces including balancing rudders located on opposite sides of the longitudinal axis of the machine, continuous cables connecting said rudders in a closed circuit, said closed circuit being provided with a pair of loops, means engaging both of said loops and simultaneously actuating them and the cables for moving said rudders in the same direction and thereby changing the effective angle of incidence of the lifting surfaces, and independent means operable upon said closed circuit at a point adjacent one of said loops to actuate said rudders in opposite directions, but only through angles such that the lift always preponderates over the drift.

5. In a combined air and land control system for aeroplanes, the combination of a plurality of control surfaces, said control surfaces comprising a pair of lateral balancing rudders disposed on opposite sides of the longitudinal axis of the craft, interconnections between said lateral balancing rudders, a common operating member interposed in said interconnections for simultaneously actuating said rudders in opposite directions but only through such small angles that the lift of the rudders always preponderates over the drift, and a separate and independent member also interposed in said interconnections which is capable of operating said lateral balancing rudders independently of the other surfaces and simultaneously in the same direction through such angles that the drift preponderates over the lift, whereby the rudders serve both as lateral balancing surfaces during flight and as wind brakes while the aeroplane is taxying along the landing surface without interfering with the other control surfaces of the craft.

6. In a combined air and land control system for aeroplanes, the combination of a plurality of control surfaces, said surfaces including a pair of lateral balancing rudders disposed on opposite sides of the longitudinal axis of the machine, interconnections between said rudders, a steering member interposed in said interconnections which is capable of actuating said rudders in opposite directions but only through such small angles that the lift is always greater than the drift, and a separate and independent operating member also interposed in said interconnections, said last named member and the connections therewith being capable of swinging said lateral balancing rudders in the same direction and entirely independently of the other control surfaces to positions at right angles to the direction of travel of the aeroplane, whereby said rudders serve as both balancing and steering rudders during flight and as efficient wind brakes during alighting or landing without interfering with the other control surfaces and the stability of the machine.

7. In a combined braking and balancing system for an aeroplane, the combination of a plurality of control surfaces comprising steering or balancing surfaces operable during flight to steer the machine and to maintain proper balance in the air, an operating member effecting movement of said balancing surfaces during flight for maintaining the proper balance and steering the machine in flight, a chassis brake operable to brake and retard the movement of the aeroplane along the landing surface, a common means operably connected with said balancing surfaces and said chassis brake for giving to said balancing surfaces movements independent of the balancing movements and through such angles that the drift preponderates over the lift and simultaneously therewith operating said chassis brake to exert a combined wind braking and retarding movement on said craft while running along the landing surface, said balancing surfaces being operable to the wind braking positions independently of the other control surfaces and thereby avoiding the disturbance of the longitudinal or lateral balance of the machine.

8. In a combined braking and balancing system for an aeroplane, the combination of a plurality of control surfaces comprising a surface effective during flight to assist in maintaining the lateral stability of the craft, with a chassis brake operable to brake and retard the movement of the aeroplane along the landing surface, and means operably connected with said balancing surface and said chassis brake for actuating said balancing surface to a position substantially at right angles to the direction of travel of the aeroplane and simultaneously therewith operating said chassis brake to exert a combined wind and brake retarding movement on said aeroplane while running along the landing surface.

In testimony whereof I affix my signature in presence of two witnesses.

GLENN H. CURTISS.

Witnesses:
LYMAN J. SEELY,
JANE O. MOORE.